United States Patent
Caidar et al.

(10) Patent No.: US 9,947,040 B2
(45) Date of Patent: Apr. 17, 2018

(54) METHOD FOR PROVIDING ELECTRONIC VIDEO FILES RELATED TO PRODUCTS OF INTEREST

(71) Applicants: Allon Caidar, San Diego, CA (US); David Caidar, San Diego, CA (US)

(72) Inventors: Allon Caidar, San Diego, CA (US); David Caidar, San Diego, CA (US)

(*) Notice: Subject to any disclaimer, the term of this patent is extended or adjusted under 35 U.S.C. 154(b) by 0 days.

(21) Appl. No.: 15/155,682

(22) Filed: May 16, 2016

(65) Prior Publication Data
US 2017/0330234 A1 Nov. 16, 2017

(51) Int. Cl.
*G06Q 30/00* (2012.01)
*G06F 17/30* (2006.01)
*G06Q 30/06* (2012.01)
*G06Q 30/02* (2012.01)
*H04L 29/08* (2006.01)

(52) U.S. Cl.
CPC ..... *G06Q 30/0641* (2013.01); *G06F 17/3002* (2013.01); *G06F 17/30861* (2013.01); *G06Q 30/0255* (2013.01); *G06Q 30/0603* (2013.01); *G06Q 30/0623* (2013.01); *H04L 67/06* (2013.01); *H04L 67/12* (2013.01)

(58) Field of Classification Search
None
See application file for complete search history.

(56) References Cited

U.S. PATENT DOCUMENTS

2011/0231260 A1* 9/2011 Price .............. G06Q 30/02
705/14.61

OTHER PUBLICATIONS

An Image and Video Search Engine for the World-Wide Web. John R. Smith and Shih-Fu Chang Department of Electrical Engineering and Center for Image Technology for New Media. 1997. (Year: 1997).*

* cited by examiner

*Primary Examiner* — William J Allen
(74) *Attorney, Agent, or Firm* — Donn K. Harms

(57) ABSTRACT

A system for generating and communicating playable videos over a computer network to customers of subscribing retailers is provided. The system employing software running on computers in engaged electronic memory, provides for the assembly and video content categorizing of information concerning each electronic video, in a library of such held in electronic memory, to allow for individual electronic video files to be matched to the customers, based a correlation thereof to the interests, buying habits, social and other ascertained customer information relating to each respective customer.

2 Claims, 1 Drawing Sheet

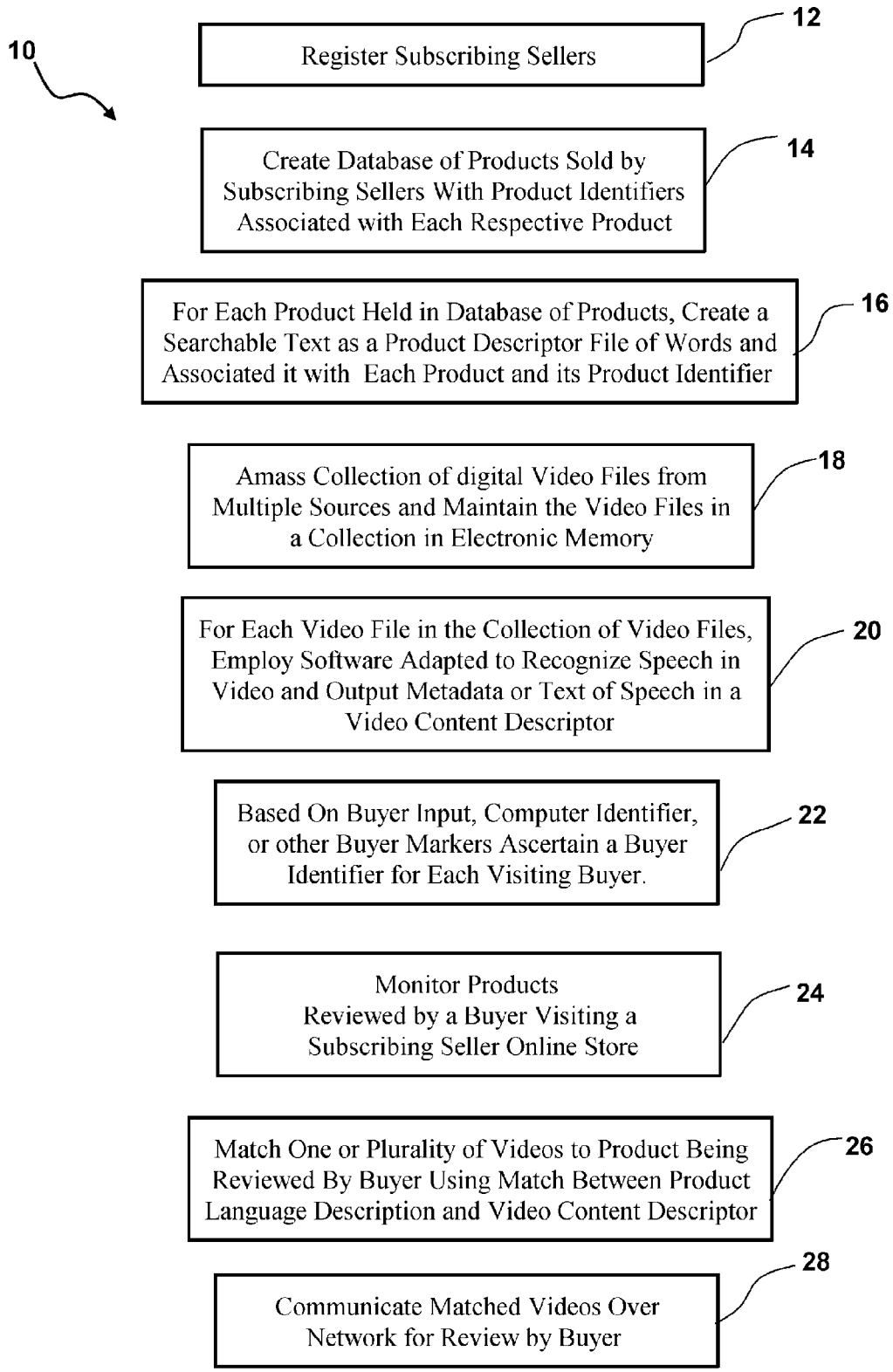

METHOD FOR PROVIDING ELECTRONIC VIDEO FILES RELATED TO PRODUCTS OF INTEREST

BACKGROUND OF THE INVENTION

1. Field of the Invention

The present invention relates generally to electronic media such as digital video files communicable over a network. More particularly it relates to a system for communicating playable videos over a network to customers of subscribing retailers, based on a relation thereof to the interests, buying habits, social and other ascertained customer information relating to each respective customer.

2. Prior Art

In recent years, with the significant increase in bandwidth abilities of network providers, and a concurrent increase in the number of computing devices accessing such broader bandwidth, the communication of digital video files between users and accessed by users from servers, has had a logarithmic increase. Whereas in previous years, where lack of carrier bandwidth, or lack of video playing functions of user devices, limited viewable depictions to individual photos and graphics, the plethora of available computing devices with access to high bandwidth networks in recent times has caused a significant increase in users accessing and sending videos over networks such as the internet.

The subject matter and content of such videos electronically sent, accessed and received by users on computing devices such as smartphones, tablet computers and even desktop computers, is conventionally subject matter of interest to individual users and their friends. Users having interests in particular subjects or causes or the like, will tend to send and receive and seek out digitally communicable video files which can be played and viewed upon their computing device of choice. On social media sites, users also tend to seek out and send and receive videos which concern a particular long term or short term interest of each respective user.

However, retailers for products and services to date, have not evolved in the presentation of graphic depictions in selling products and services on their online commerce sites. The vast majority of retailers and service providers still only communicate photos and single page graphic depictions to the display screen of potential customers. This is true even when such customers are repeat visitors to the retailer website.

As a consequence, customers for many retailers and service providers, who themselves may be viewing and be broadcasting videos on their smartphones, pad computers or the like, are viewing only single page photos and graphic depictions of the products they are considering for purchase from retailers, and a valuable selling tool is being lost.

The reasons for retailers and service providers failing to take advantage of video communications to potential and repeat customers are as many as the number of such retailers. While such retailers and service providers have access to broadband network connections with current and potential customers, they generally have an inability to ascertain the content of certain videos which may correlate to a costumer's interest in a particular product or service, in order to make the determination to send such a video to a customer. For example, manufactures of products such electronics might make videos available regarding many products in their line of goods. However absent the provision of a cross reference with the individual products and a provided video, retailers would be at a loss to match the provided video to customer interest in a product or line of products.

Additional video content concerning individual products and services is widely available from critics who rate many products and services in short videos for a living, to bloggers who are well educated regarding various products and services of interest to fellow bloggers, or potential buyers who have an interest in a product or service rated by a blogger, but unknown to the customer, and/or to the product retailer or service provider because it is the speaking content of the video which generally lacks metatags there about, which relates to the product or service or customer interest.

As a consequence, potential and returning customers to the online commerce websites of retailers and service providers, are not provided with video snippets and short presentations which better inform them about particular products, which could help them make an immediate decision as to a purchase. Likewise, retailers of products and service providers for services, lacking the ability to provide current and potential customers relevant video shorts and snippets concerning various products and services determined of interest to customers, and lacking the ability to gather such videos and make such customer relational connections, lose a valuable sales tool.

Thus, retailers lose sales which they probably could have closed with customers, because of this failure to communicate a video of interest to the customer and relating to the product which might have closed the sale, was not presented. Further, such retailers will continue to fail to take advantage of the power of video information when presented to potential customers to close the sale and continue to lose many sales which may have been captured if the customer had the opportunity to better review product information in one or a plurality of related videos which might have been provided to them.

As such their exists an unmet need for a method for the gathering of videos of different subject content concerning products and services, from widely disparate sources which are viewable by customers visiting product retailer and service provider websites. Such a system should be able to ascertain and identify such gathered videos as associated with one or a plurality of products or services available for purchase by customers on the website of a retailer or service provider. Such a method or system should be able to identify individual customers and maintain a database on their likes and dislikes and interests and other data for which each buyer would find a video interesting. Such a system should be able to gather and electronically store such videos from such a wide variety of sources, concerning or relating to each product or service, and save such with identifiers related thereto which are employable to match each such video, to either a product or service or of interest to an individual buyer or combinations thereof, so as to provide retailers and service sellers the ability to display and otherwise communicate such videos to customers or potential customers.

The forgoing examples of related art and limitations related therewith are intended to be illustrative and not exclusive, and they do not imply any limitations on the exercise device and method described and claimed herein. Various limitations of the related art are already known or will become apparent to those skilled in the art upon a reading and understanding of the specification below and the accompanying drawings.

An object of the present invention is to provide a system for gathering playable videos concerning products or services from a wide variety of sources, and to electronically review and associate each such video with a video identifier which is cross referenced in an association to one or a plurality of products or services which may be stored and later provided in relation to individual buyers in a database of such buyers.

It is another object of the invention to electronically host, or provide electronic communication of such videos in digital format playable on computing devices of customers for products or services, based on ascertained interests of such customers, or based on ascertained relationships of such videos to products or services to which customers have input an interest.

SUMMARY OF THE INVENTION

The present invention provides a system for gathering and electronically storing videos from a wide variety of sources which may be subsequently communicated to a current or potential customer for a product or service from a retailer or service provider. The communicated video to each respective buyer is determined to provide each respective customer information relating to a particular product or service being considered by each respective customer. By videos is meant, a sequence of images processed electronically into an analog or digital format, which may be displayed on a video screen with sufficient rapidity as to create the illusion of motion and continuity, such as a short movie recorded electronically, usually including a soundtrack which may be heard on loudspeakers concurrently with display of the video. Further, such videos are communicable over a computer network as a digital file in a format viewable on the video display of the computing device of the recipient.

By retailer for products is meant any person or company with a website offering products of their own, or offering the products of others, for sale on a website which may be accessed over a network such as the internet. By service provider is meant any person or company offering services of their own, or offering the services of others, for sale on a website which may be accessed over a network such as the internet. Further, retailers may also offer services and service providers may also offer products for sale.

Essentially, any website accessible by customers over a network such as the internet, which offers either products and/or services for sale to such customers, can be a retailer or service provider, and a subscribing seller herein.

In the method and system herein, subscribing sellers will register with the system provider herein, and provide the system provider with electronic access to the website of the subscribing seller to ascertain customers and products thereon. Thereafter the system provider herein will communicate videos in digital files stored in electronic memory of the system provider herein, which are playable upon a computing device of customers visiting a website of a subscribing seller herein. The videos so communicated will be viewable by the potential customer, concurrent with the customer's visit in most instances, to a website of a subscribing seller, or in a follow up communication thereafter. As noted herein, the communicated videos from the system provider, will be determined to match or relate directly to the product or service a customer is reviewing on the E-commerce site of the online retailer.

In the system herein, subscribing sellers will secure an account from the system provider.

Once a subscribing seller is registered, they will provide the system provider listings of all products and/or services sold by each respective subscribing seller, or they may provide the system provider access to the subscribing seller's computer system whereby the system provider can ascertain the products and services sold by each subscribing seller. Many sellers or products and services used standardized software for tracking and identifying product inventory and the system provider may be given access or listings of such.

The system provider will store in a database listing of products sold by a respective subscribing seller, a product identifier for each service and or product offered for sale by a subscribing seller, to any customer visiting the E-commerce or website of the subscribing seller. It should be noted a product identifier signifies an identifier for either products sold by any subscribing seller, or services sold by any subscribing seller, and essentially, anything which may be purchased by a customer visiting the E-commerce website of a subscribing seller.

In the case of products, the product identifier may be for example the products SKU code in the seller's system, it may be a product number or service number used for identification of such by a seller, or it may be a Universal Product Code (UPC Code) assigned to specific products sold by a seller, or another alphanumeric string which may be employed as a product identifier. UPC codes in many cases may be preferable due to their use for the same products by many sellers of products.

With each product identifier, preferably is associated a string of words in text form, in a product language description which describe the individual product and/or attributes of the product, and/or a class or type of product, or other text employable to provide readable and searchable language description of the product or service. This product language descriptor may include the name of the product and/or its trademark, and if available text describing the individual product and its specifications and other descriptive text. Each language description is associated with a respective product identifier of each product or service sold by each subscribing seller. As noted herein, this product language description is preferred in all modes of the system herein as it may be employed to discern a subject matter and/or product match to the stored videos as described herein.

In a particularly preferred mode of the invention, the system provider of the system herein, will also search for, request from manufactures, bloggers, reviewers, and other sources, digital videos which will be stored in electronic memory accessible by the system, and software running on computers enabling the system, in a library of digital video files playable on a computer.

As noted such videos are digital files which may be communicated to a computer over a network and which will run on the remote computer and produce a video on the video display in combination with sound. As further noted, potential customers who have become used to seeking and viewing video information on a variety of subjects, have been found more likely to complete an online purchase, when provided with multiple viewable videos which include information from a variety of sources concerning the product or service they may wish to purchase.

This collection of videos is gathered by the system provider from any source possible where the system provider may receive, buy, or otherwise obtain the video and store it in electronic memory. Subsequent to the collection of each respective video, metadata concerning the content of each video is associated with each respective video. The system provider in a novel manner of ascertaining and associating such metadata, will electronically review each video in electronic memory to ascertain the oral communication or speech contained in each video. During this digital review in memory, the system will employ software adapted to convert electronically stored oral speech into digitally stored text. This electronic text file containing some or all of the speech or oral communication in each video, is stored in memory in association with each video clip stored in memory, as a searchable file of text and or metadata, identifying the speech and other oral content of the video. The text or metadata representative of such speech in each video is thus searchable for the subject matter as well as the names and trademarks and descriptions of products and services contained within the video.

This is a most important feature of the system herein because while electronic video which is downloadable over a networks such as the internet, is available from an infinite number of sources, virtually none of those sources or video makers, includes any means to identify the speech or oral content of the audio in the video, other than viewing the video by a human.

Manufacturers release video files concerning their own manufactured products. Bloggers make videos concerning products related to their expertise. Product reviewers who are well known, as well as lesser known, frequently produce downloadable videos reviewing and comparing products and service. In fact, in the world with the internet, such playable videos are downloadable in digital format from millions of sources.

However, absent a title of the video if attached in meta data from the producer, there is virtually nothing describing in any discernable fashion the actual and detailed subject matter and products and services being reviewed in the video.

The system herein, by employing software adapted to listen to digital audio soundtracks of each video, and produce a text output of the language spoken in each video, allows in this step of the process, for the system provider to capture text from the spoken words within the video, and form a video content descriptor.

During the process of determining which video or videos to be communicated to a buyer, concerning a product or service sold by a subscribing seller, the system will, based on the product identified and the product language description associated therewith, compare the product language description to text of the video content descriptors, and thereby ascertain matches between videos stored in memory which relate to the product being reviewed by a buyer. This allows the system, based on matches of video content descriptors to the product language description associated with a product, or product identifier, to communicate one or more electronic video files to a potential buyer of the product identified as one of interest to the buyer.

In this fashion, playable video files having audio soundtracks, from product reviewers, bloggers, product owners, manufactures, or other sources of video, which match and contain content relating to the product or product identifier of the product of interest to a buyer, can be sent to the buyer to aid in their buying decision.

Further, the system herein can also employ the product language descriptions and the video content descriptors held in memory, to send buyers videos determined of high interest to each such buyer through another step using buyer identifiers.

In this mode or step of the system, which may be used in combination with the noted steps above, the system will assemble and maintain a database, of buyers of products, irrespective of which subscribing seller may be visiting at the time. Each buyer in the database of buyers stored in electronic memory in a relational database, will be assigned a buyer identifier. Associated with each buyer identifier, will be text concerning the buyer's personal information. Such will include the interests of the buyer, previous purchases of each buyer, and other information garnered from each purchase of each buyer, and from social media websites associated with each buyer, and other online information concerning each buyer which may be matched with their respective buyer identifier. This text associated with each buyer provides a buyer profile associated with each buyer identifier of each buyer.

Consequently, as the text or descriptive profile of language for each buyer profile is assembled and enlarged over time by the gathering of information concerning each buyer from sales and social media, and online searching, and other digital trackable information relating to the buyer, their likes, interests, dislikes, associations, etc. will all be related to each respective buyer in the text in the buyer profile.

The system, using software to compare the text of the buyer profile, which may be segmented into different traits such as likes, interests, and other information, can match the text in the buyer profile, with video content descriptors ascertained for each video, and with product language descriptions related to each product, and send each respective buyer having a buyer identifier in the system, videos highly targeted to the interests of each respective buyer. In cases where the buyer may be reviewing products on a subscribing seller site, once the buyer identifier is determined, the system can perform the same comparison fo video content descriptors and product language descriptions with the buyers profile, to again send videos to each respective buyer which are targeted to be of interest to that buyer based on the match to their profile and the video content descriptor and/or the product language description.

Thus, buyers visiting any subscribing seller, who are identified as having a buyer identifier and known to the system provider, can be sent videos for watching which are highly targeted to interest the buyer, and relate to the products sold by each respective subscribing seller. This as can be discerned, is accomplished by matching the product language description of the products being reviewed by the identified buyer, with video content descriptors which show a match to having the product subject matter, and matching the text in the profile of the identified buyer as to interests or other categories which also match the video content descriptor relating to a product language description of a product's product identifier.

As a consequence, buyers visiting the websites of subscribing sellers, are provided playable informational videos with soundtracks, by communicating digital video files to the server of the subscribing seller for pay within a widow upon the video screen of the computing device used by the buyer, or which may be sent to the buyer for later review. The provision of such video information which directly relates to the product being reviewed by the buyer, and/or videos which relate to the product and are also determined to be of high interest to the buyer based on his profile text matching the video content descriptor, provide a significant motivator to the buyer, to actually purchase the product, rather than continue researching on multiple websites.

With respect to the above description, before explaining at least one preferred embodiment of the herein disclosed video matching and communication system invention in detail, it is to be understood that the invention is not limited in its application to the details of construction and to the arrangement of the steps in the following description or illustrated in the drawings. The invention herein described is capable of other embodiments and of being practiced and carried out in various ways which will become obvious to those skilled in the art on reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other electronic and software-enabled matching systems for videos to products and to buyers thereof, and methods and systems for carrying out the several purposes of the present disclosed system. It is important, therefore, that the claims be regarded as including such equivalent construction and methodology insofar as they do not depart from the spirit and scope of the present invention.

Further objectives of this invention will be brought out in the following part of the specification wherein detailed description is for the purpose of fully disclosing the invention without placing limitations thereon.

BRIEF DESCRIPTION OF DRAWING FIGURES

FIG. 1 depicts a graphical depiction of the steps or method of the system herein for communicating videos matching buyer product interest to buyers.

It should be noted the steps in the system may be reordered and that other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, any directional prepositions if employed, such as up, upwardly, down, downwardly, front, back, top, upper, bottom, lower, left, right and other such terms refer to the device or depictions as such may be oriented are describing such as it appears in the drawings and are used for convenience only. Such terms of direction and location are not intended to be limiting or to imply that the device or method herein has to be used or positioned with graphics in any particular orientation. Further, computer and network terms such as network, database, browser, media, digital files, videos and other terms are for descriptive purposes only, and should not be considered limiting, due to the wide variance in the art as to such terms depending on which practitioner is employing them. The system herein should be considered to include any and all manner of software, firmware, operating systems, executable programs, files and file formats, databases, computer languages and the like, as would occur to one skilled in the art in any manner as they would be described.

Now referring to drawings in FIG. 1 there is depicted a graphical showing of the system 10 herein and the steps or method of discerning videos from a collection of digital videos stored in electronic memory engaged with a computer, which are matched to a particular product being reviewed by a buyer, whereby one or a plurality of matched videos may be communicated over a network for viewing by the buyer during the purchase consideration.

As shown in a subscriber registration step 10, subscribers to the service herein provided by the service provider, subscribing sellers will register with the system 12. Such can be all the information needed to conventionally transact business between the parties such as name, location, contact information, and other information.

Once so registered, in a product database creation step 14, the subscribing seller will provide the system provider, with electronic data which may be formed to a database held in memory containing all of the products offered for sale by the subscribing seller, on an E-commerce website featuring the products of the subscribing seller and graphic interfaces employable by the buyer to purchase those products in a communication over a network such as the internet.

As noted above, for each product a product identifier is assigned which relates to that product.

In another step a product descriptor file is created 16, which is an electronically stored file of text or metadata which relates directly to a product and or a respective product identifier, which contains searchable text or metadata, which is correlated to a respective one of the products, sold by the subscribing seller. All of the group of product descriptor files, including at least one for each respective product, form a database of searchable language product descriptor files, which is stored in electronic memory accessible by a computer running software adapted to the task of storing, searching and retrieving such files.

In another step of the system 10 herein, which is ongoing and may be in no particular order due to the ongoing nature, the system provider amasses a collection of digital video files 18 which are stored in electronic memory and are retrievable for communication over a network subsequently. The digital video files 18 are in conventional digital formats playable on the computing devices of buyers. As noted earlier this collection of video files can be collected from a plethora of sources for example manufacturers, product reviewers, bloggers, social media, or prior purchasers.

In another step of the system 10, which is also ongoing since the collection of digital video files is as noted, ongoing, for each respective video file in the collection in electronic memory, a video content descriptor 20 is determined. As noted above, the system employs software running in electronic memory on a computing device, to electronically review the audio sound track of each video file in electronic memory, and recognize speech and output the language in text or metadata to form a video content descriptor 20 file, stored as a searchable file of words or metadata. This video content descriptor file 20 may contain searchable text or alphanumeric characters directly correlated some or all of the content of speech or language found in the audio track, which has been recognized in each video file in a manner employable for a later match to a portion of the text file, to a searched product or input term from a buyer. Optionally, the video content descriptor file 20, may be formed by humans listening to the sound track and inputting words from the soundtrack to the audio descriptor file 20, or combinations of software and human input.

In another step in the system 10, which can be optional, should ascertaining a buyer identity not be desirable to a buyer, a buyer identifier 22 may be determined for each buyer visiting a subscribing sellers website. This buyer identifier may be stored in a buyer database and used for other reasons noted herein, or simply used by the system to match a current buyer with a product being reviewed and/or searched for, on a subscribing sellers website.

During visits by buyers to a subscribing seller's E-commerce or other website selling products, the system operator for the system 10 herein is given electronic access over a network such as the internet or a private network, to the subscribing sellers website whereby the system 10 will monitor the buyers for individual products 24, and the products being reviewed and/or searched for by the buyer for potential purchase. Ascertaining a buyer interest as noted may be accomplished by providing a search window on the selling website for text input, and monitoring such, or ascertaining a buyer interest where the buyer chooses a presented product resulting from a search, or review of an online catalog, where a cursor or screen touch or other designator is employed by the buyer to input an interest from products presented to the buyer for review.

Ongoing during this monitoring of buyers for products 24 in which they seem interested, using software running in computer memory adapted to the task of searching databases and ascertaining matches of text, words, or metadata 26, the system 10 will match one or plurality of videos held in the collection in electronic memory, to each respective product being reviewed by a buyer. This is accomplished by discerning a match between a product language Description related to the product or product identifier of the product being reviewed, and each respective video content descriptor relating to one or a plurality of respective videos held in electronic.

In another step of the system 10, based on matches in video content descriptor to each respective product language description of a product with a product identifier, one or a plurality of electronic video files, discerned as a match, are made available for a buyer to choose to review, or simply sent over the network 28, to the buyer for play on their computing device. In this fashion, for each product in which a buyer shows interest, that buyer may be provided one or a plurality of videos for viewing and listening which include information concerning the product or service of interest. Further, the video files sent to each buyer for each product will directly relate to that product and provide the buyer with information concern each respective product of interest, no matter the source of the stored video file, because the system has discerned a language match in the audio track of the video, and/or a match to metadata or should it have been provided with the video file.

While all of the fundamental characteristics and features of the video content matching and provision system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that upon reading this disclosure and becoming aware of the disclosed novel and useful system, various substitutions, modifications, and variations may occur to and be made by those skilled in the art without departing from the spirit or scope of the invention. Consequently, all such modifications and variations and substitutions, as would occur to those skilled in the art are considered included within the scope of the invention as defined by the following claims.

What is claimed is:

1. A method for providing, over a computer network to a computer operating a website of a seller, electronic video files held in electronic memory of a computer of a system provider, the electronic video files related to products of interest of a buyer visiting the seller website, the method comprising:

inputting to the computer of the system provider, information registering users as sellers of products with the system provider;

forming, by a computer of the system provider, an electronic product database relating to each respective seller identifying with a respective product identifier relating to each product offered for sale upon each respective website operated by each respective seller;

creating, by the computer system of the system provider, a respective product descriptor file for each said product having a product identifier, using submitted product descriptions from each respective said seller relating to each said product offered for sale to buyers visiting a website of each respective seller, said product descriptor file containing searchable text descriptions of each respective product held in said electronic product database;

storing each of said product descriptor files in said electronic memory in a database of said product descriptor files;

continuously searching, by the computer of the system provider, websites on the internet for electronic video files related to respective products offered for sale, the electronic videos having soundtracks;

forming, by the computer system of the system provider, a library of electronic video files having soundtracks by downloading said electronic video files having soundtracks discovered by said continuously searching of said websites to said electronic memory;

generating, by the computer of the system provider, a video content descriptor file related to each respective electronic video file, each said video content descriptor file containing soundtrack text as searchable text of a respective sound track of a respective said electronic video file in said library of electronic video files;

storing each said video content descriptor file in said electronic memory in a searchable database containing all said video content descriptor files;

monitoring, by the computer of the system provider, the input of buyers visiting respective websites offering said products of said sellers for sale, for an input communicating an interest in a product on said seller website;

ascertaining, by the computer system of the service provide based on said monitoring, a product identifier of a product of interest to said buyer from said product database associated with said website of said seller;

matching, by the computer of the system provider, said searchable descriptions in a respective said product description file correlated to said product of interest and held in said database of said product descriptor files, to a video content descriptor file related to a respective said video file, to ascertain a matched video file held in said library of electronic video files; and communicating, by the computer of the system provider to a computer associated with said website of said seller, said matched video file such that said matched video file is displayed on said website of said seller to said buyer for which said product of interest is ascertained.

2. The method of claim 1, additionally comprising:

for each said electronic video file held in said library of electronic video files having soundtracks, ascertaining by the computer of the system provider, a presence of metadata within said electronic video files; and inserting said metadata within the respective video content descriptor file related to each respective electronic video file in said library of electronic video files, whereby content of both the soundtrack and any included metadata descriptions of each respective said electronic video file are both within said video content descriptor files.

\* \* \* \* \*